(12) United States Patent
Vasseur et al.

(10) Patent No.: US 9,497,215 B2
(45) Date of Patent: Nov. 15, 2016

(54) STEALTH MITIGATION FOR SIMULATING THE SUCCESS OF AN ATTACK

(71) Applicant: Cisco Technology, Inc., San Jose, CA (US)

(72) Inventors: Jean-Philippe Vasseur, Saint Martin d'Uriage (FR); Andrea Di Pietro, Lausanne (CH); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/338,653

(22) Filed: Jul. 23, 2014

(65) Prior Publication Data

US 2016/0028764 A1    Jan. 28, 2016

(51) Int. Cl.
*G06F 11/00* (2006.01)
*H04L 29/06* (2006.01)
*G06F 12/14* (2006.01)

(52) U.S. Cl.
CPC ....... *H04L 63/1458* (2013.01); *H04L 63/1416* (2013.01); *H04L 2463/141* (2013.01)

(58) Field of Classification Search
None
See application file for complete search history.

(56) References Cited

U.S. PATENT DOCUMENTS

| 6,944,673 | B2 |   | 9/2005  | Malan et al. |             |
|-----------|----|---|---------|--------------|-------------|
| 8,793,360 | B1 |   | 7/2014  | Belgard et al. |           |
| 8,925,080 | B2 | * | 12/2014 | Hebert       | H04L 63/1491 |
|           |    |   |         |              | 726/23      |
| 9,191,398 | B2 | * | 11/2015 | Bolzoni      | H04L 12/2602 |

(Continued)

OTHER PUBLICATIONS

Schoenwaelder et al., "Simple Network Management Protocol (SNMP) over IEEE 802 Networks", Request for Comments 4789, Nov. 2006, 9 pages, The Internet Engineering Task Force Trust.

*Primary Examiner* — Dede Zecher
*Assistant Examiner* — Trang Doan
(74) *Attorney, Agent, or Firm* — Parker Ibrahim & Berg LLC; James M. Behmke; Stephen D. LeBarron

(57) ABSTRACT

In one embodiment, attack traffic corresponding to a detected DoS attack from one or more attacker nodes is received at a denial of service (DoS) attack management node in a network. The DoS attack management node determines attack information relating to the attack traffic, including a type of the DoS attack and an intended target of the DoS attack. Then, the DoS attack management node triggers an attack mimicking action based on the attack information, where the attack mimicking action mimics a behavior of the intended target of the DoS attack that would be expected by the one or more attacker nodes if the DoS attack were successful.

25 Claims, 6 Drawing Sheets

(56) References Cited

U.S. PATENT DOCUMENTS

| | | | |
|---|---|---|---|
| 9,356,942 B1* | 5/2016 | Joffe | H04L 63/1408 |
| 2002/0178383 A1* | 11/2002 | Hrabik | H04L 63/1433 |
| | | | 726/4 |
| 2003/0056116 A1* | 3/2003 | Bunker | H04L 12/2602 |
| | | | 726/25 |
| 2004/0266533 A1* | 12/2004 | Gentles | G06F 21/32 |
| | | | 463/42 |
| 2007/0044153 A1* | 2/2007 | Schuba | G06F 21/55 |
| | | | 726/24 |
| 2007/0142030 A1* | 6/2007 | Sinha | H04L 63/1433 |
| | | | 455/410 |
| 2007/0150954 A1* | 6/2007 | Shon | H04L 63/1416 |
| | | | 726/23 |
| 2007/0271614 A1* | 11/2007 | Capalik | H04L 63/1441 |
| | | | 726/23 |
| 2007/0300304 A1 | 12/2007 | Lindgren | |
| 2008/0005782 A1* | 1/2008 | Aziz | G06F 9/45537 |
| | | | 726/3 |
| 2009/0007270 A1* | 1/2009 | Futoransky | H04L 63/1433 |
| | | | 726/25 |
| 2009/0193293 A1* | 7/2009 | Stolfo | G06F 21/564 |
| | | | 714/26 |
| 2011/0185420 A1* | 7/2011 | Lee | G06F 21/31 |
| | | | 726/22 |
| 2013/0074183 A1* | 3/2013 | Yoon | G06F 21/00 |
| | | | 726/22 |
| 2013/0263256 A1 | 10/2013 | Dickinson et al. | |
| 2014/0082730 A1* | 3/2014 | Vashist | H04L 63/1416 |
| | | | 726/23 |
| 2014/0101724 A1* | 4/2014 | Wick | H04L 63/1491 |
| | | | 726/4 |

* cited by examiner

STEALTH MITIGATION FOR SIMULATING THE SUCCESS OF AN ATTACK

TECHNICAL FIELD

The present disclosure relates generally to computer networks, and, more particularly, to stealth mitigation for simulating the success of an attack.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of a computer network is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging when network resources are limited, such as in the case of a low power and lossy network (LLN).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
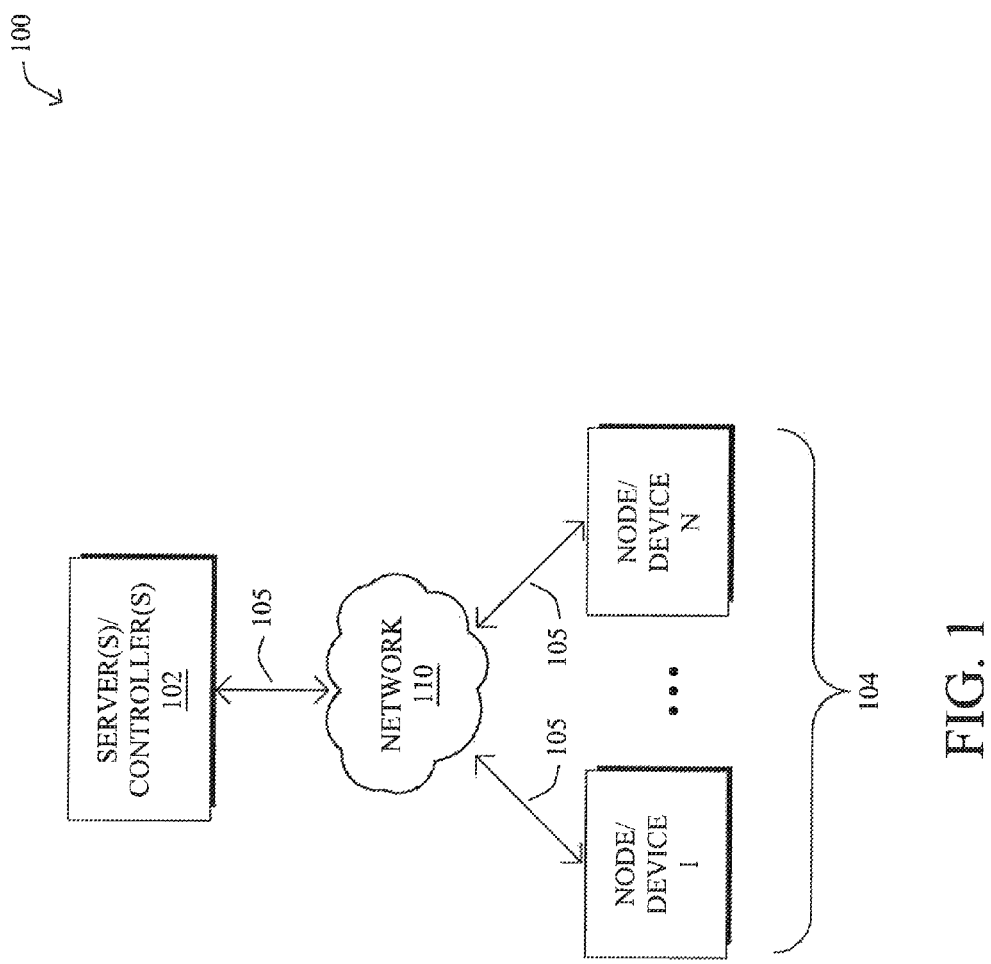
FIG. 1 illustrates an example communication network.

According to one or more embodiments of the disclosure, attack traffic corresponding to a detected DoS attack from one or more attacker nodes is received at a denial of service (DoS) attack management node in a network. The DoS attack management node determines attack information relating to the attack traffic, including a type of the DoS attack and an intended target of the DoS attack. Then, the DoS attack management node triggers an attack mimicking action based on the attack information, where the attack mimicking action mimics a behavior of the intended target of the DoS attack that would be expected by the one or more attacker nodes if the DoS attack were successful.

According to one or more additional embodiments of the disclosure, a device (e.g., trap server, proxy, etc.) receives, from a DoS attack management node, a trigger for an attack mimicking action based on a DoS attack from one or more attacker nodes as detected by the DoS attack management node; and determines attack information relating to the attack traffic from the trigger, the attack information including a type of the DoS attack and an intended target of the DoS attack. As such, the device performs the attack mimicking action based on the attack information, where the attack mimicking action mimics a behavior of the intended target of the DoS attack that would be expected by the one or more attacker nodes if the DoS attack were successful.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer system 100 illustratively comprising one or more server(s)/controller(s) 102 and one or more nodes/devices 104 (e.g., a first through nth node/device) that are interconnected by various methods of communication. For example, links 105 may be wired links or shared media (e.g., wireless links, PLC links, etc.) that illustratively form a network 110. Those skilled in the art will understand that any number of nodes, devices, links, etc. may be used in computer system 100, and that the view shown herein is for simplicity. Also, those skilled in the art will further understand that while the network is shown in a certain orientation, system 100 is merely an example illustration that is not meant to limit the disclosure.

In general, server(s)/controller(s) 102 provide some form of control over nodes/devices 104 and, more generally, over the operation of network 110. For example, servers/controllers 102 may include, but are not limited to, path computation engines (PCEs), network controllers, network management systems (NMSs), policy engines, reporting mechanisms, or any other form of device or system that provides some degree of global or localized control over other devices in the network.

Nodes/devices 104 may include any form of networking device used to generate, forward, receive, etc., traffic within network 110. For example, nodes/device 104 may include, but are not limited to, routers, switches, computers, or the like.

Data packets (e.g., traffic and/or messages sent between the devices/nodes) may be exchanged among the nodes/devices of the computer system 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

In some embodiments, network 110 may be or may include a WAN, LAN, service provider network, customer edge network, multi-protocol label switched (MPLS) network, IP network, wireless network, mesh network, shared media network, virtual private network (VPN), or any other form of computing network. In one embodiment, network 110 may be, or may include, a Low Power and Lossy Network (LLN). LLNs (e.g., certain sensor networks), may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 2:
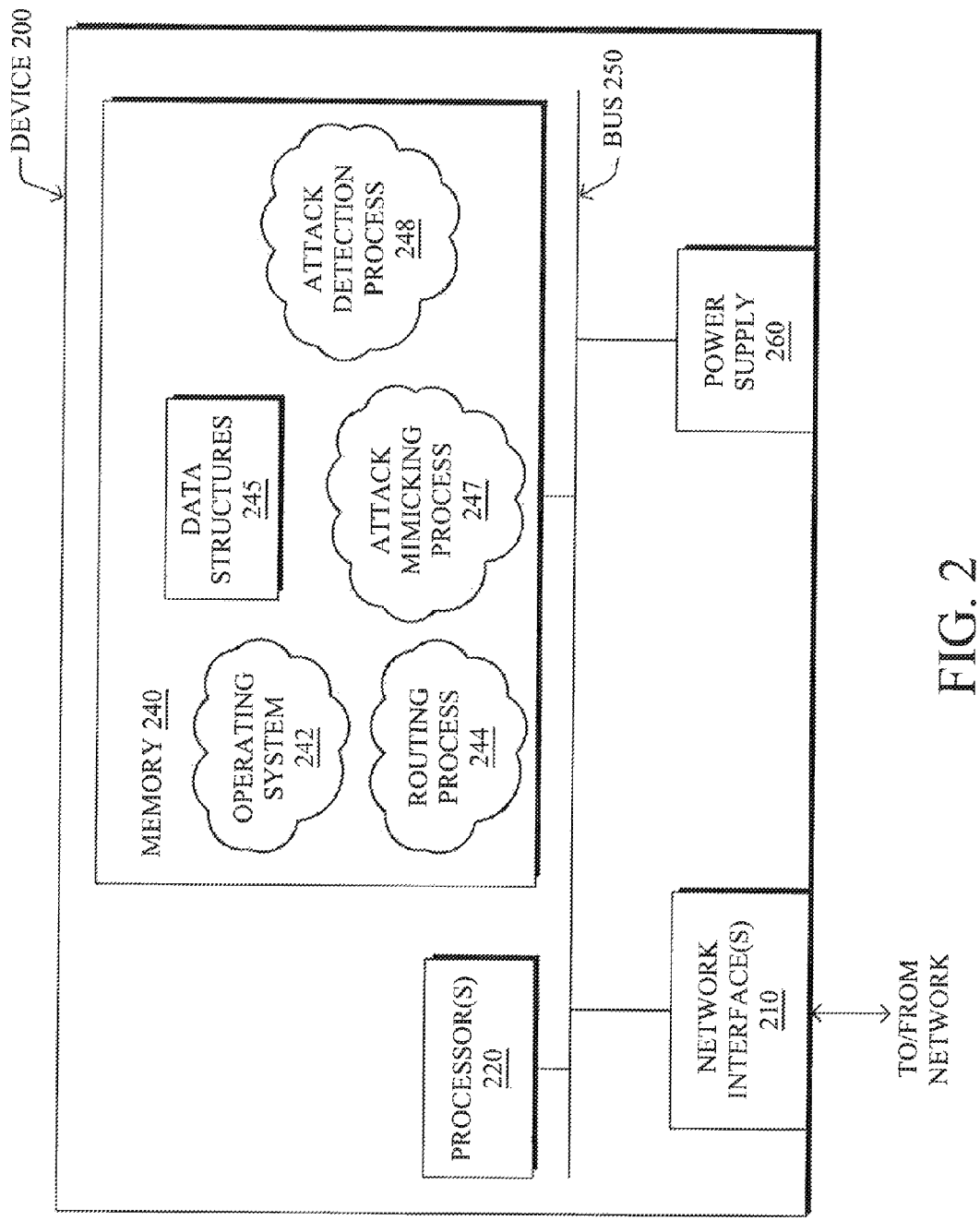
FIG. 2 illustrates an example network device/node.

FIG. 2 is a schematic block diagram of an example node/device 200 (e.g., a server/controller 102, a node/device 104, etc.) that may be used with one or more embodiments described herein, e.g., as any of the devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, an attack mimicking process 247, and/or an attack detection process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Attack detection process 248 includes computer executable instructions executed by the processor 220 to perform various functions, such as attack detection and reporting. In various embodiments, attack detection process 248 may use machine learning to determine whether an attack and/or a specific type of attack is detected. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Accordingly, attack detection process 248 may be an attack detection classifier that classifies network traffic or conditions into either an "attack" category or a "normal operation" category, based on learned behavior of the network. In some implementations, attack detection process 248 may also be configured to use additional categories (e.g., classification labels), such as labels indicative of specific types of attacks.

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.). In some cases, ANN classifiers may be hierarchical in that a more powerful classifier verifies a conclusion reached by a lower-powered classifier. Other machine learning techniques that may be used in an attack detection classifier may include, but are not limited to, support vector machines (SVMs), naïve Bayesian models, decision trees, and the like.

Attack detection process 248 may also employ anomaly detection techniques, to classify network conditions as being indicative of an attack. Anomaly Detection (AD) is a data mining and machine learning technique that entails detecting, from a flow of data, the elements of the flow that do not follow the same pattern as the other flow elements. In particular, AD techniques may be used to construct a model of normal behavior and may use the model to detect data points that are unlikely to fit the model. Example AD techniques include, but are not limited to, k-NN techniques, one-class SVM techniques, replicator NN techniques, etc. Notably, such techniques may be used by learning machine process 248 to detect previously unseen forms of attacks.

In further embodiments, attack detection process 248 may use clustering techniques, to detect a potential network attack. Clustering denotes a family of techniques in which the objective is to group objects according to some (usually predefined) notion of similarity. For instance, clustering is a very popular technique used in recommender systems (RS) for grouping objects that are similar in terms of people's tastes. This way, the system can propose new products that the user will like with a high probability, based on previous choices of this particular user. Typical clustering algorithms are k-means, DBSCAN or Mean-Shift, among others.

Attack mimicking process 247, as described in greater detail below, includes computer executable instructions executed by the processor 220 to perform functions that include mimicking a behavior of an intended target of a DoS attack that would be expected by one or more attacker nodes if the DoS attack were successful. The attack mimicking process 247 may be operated in conjunction with the attack detection process 248.

Figure 3A:
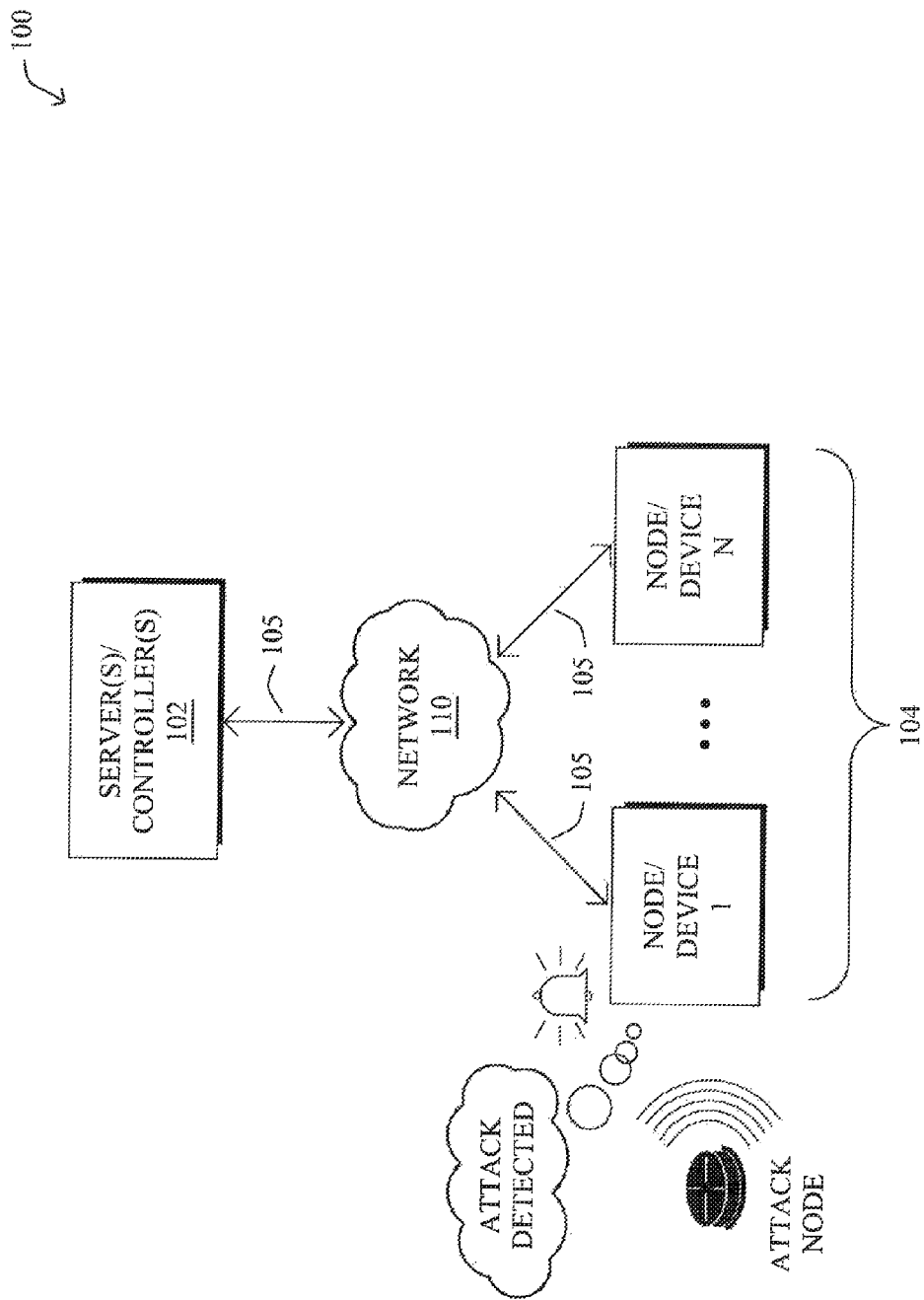
FIGS. 3A-3B illustrate an example of a network attack being detected.
Figure 3B:
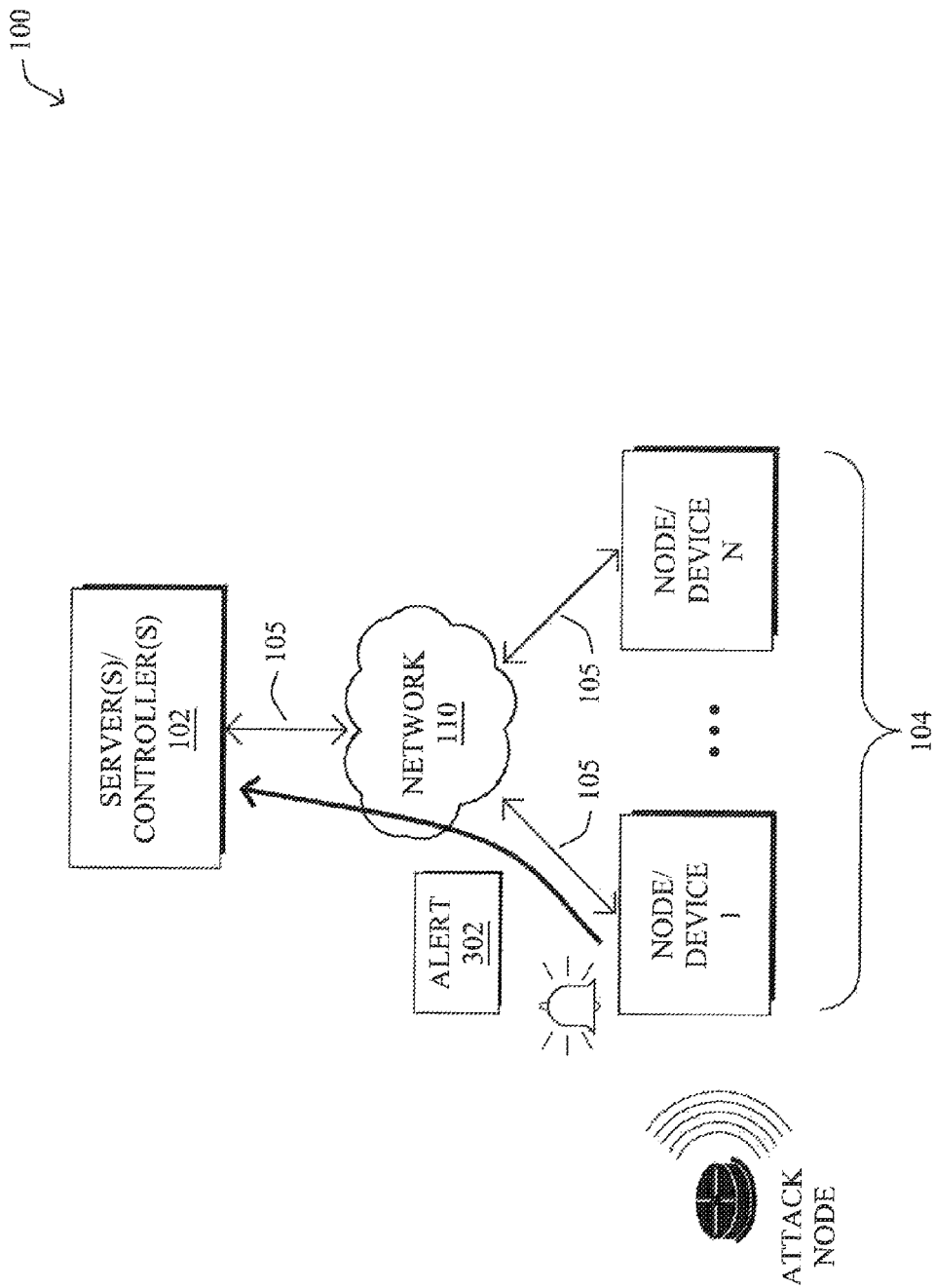

FIGS. 3A-3B illustrate an example of a network attack being detected, according to various embodiments. As shown, assume that a particular node/device 104 is under attack from an attack node. During a DoS attack, for example, the attack node may attempt to flood the node/device with request traffic (e.g., SYN flooding), thereby reducing the amount of resources available at the device/node (and potentially the network itself) for legitimate traffic. Notably, other forms of DoS attacks may attempt to send a high volume of traffic (e.g., a volume based DoS attack) and may, in some cases, be distributed DoS (DDoS) attacks.

As shown in FIG. 3A, assume that the particular node/device 104 under attack is configured to execute an attack detector process (e.g., process 248). In general, the attack detector process may be operable to observe traffic behavior and apply a label (e.g., a classification) to the observed traffic behavior. For example, the node/device 104 under attack may determine that a sharp increase in request traffic is indicative of an attack (e.g., the observed behavior may be labeled as an attack by the device's machine learning process). In such a case, as shown in FIG. 3B, the node/device 104 may initiate countermeasures, such as sending an alert 302 to one of the servers/controller 102 (e.g., to alert a network administrator), etc.

As referenced above, denial of service is a broad term for any kind of attack aiming, by any means, at making a particular service unavailable (be it a certain application running on a server or network connectivity itself). This is usually performed by bringing the target's resources to exhaustion (target resources may range from bandwidth to memory and CPU). In greater detail, a denial-of-service attack may consist of flooding a target network with hundreds of megabits of traffic (e.g., a volume-based DoS), exhausting a server state by opening a number of TCP connections (e.g., SYN flooding), or by making an HTTP server unavailable by sending it an overwhelming number of requests. An attack may be subtle and exploit well-known vulnerabilities in the target system (e.g., a large number of fragmented IP packets may exhaust the resources of a router), thus leading to attacks that are difficult to detect and mitigate.

Nowadays, denials of service attacks are mostly distributed (DDoS), meaning they are carried out by multiple sources at the same time, making it more difficult to track. In many cases botnets (i.e., armies or infected hosts spread across the network and under the control of a single master) are used for mounting DoS attacks. In addition, source addresses used for attacks can be spoofed, so that blocking an offending address is potentially useless.

DoS attacks can be easy to detect when they are brute-force (e.g., volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. As a result, machine learning techniques are particularly beneficial for learning the behavior of these attacks for detecting them before a server or an entire network becomes unavailable.

As further noted above, DoS/DDoS attacks are becoming increasingly more sophisticated. Although originally volumetric, and consequently easy to detect, many DoS attacks are now subtle, targeting servers, and using massively distributed approaches. Even more sophisticated attacks are now capable of checking that an attack has been effective. This allows the attacker to move to another target (i.e., rotating attacks), thus leading to an even more impactful attack. Also, once the attacker realizes that the attack has been detected, the attacker can change attack source and/or vector, thus requiring traffic flagging and mitigation to be performed again. Furthermore, when the system being attacked is able to mitigate the attack by stopping the attacking traffic, the attacker may potentially retro-engineer the protection in place to continue "improving" the attacks to find the weakness in the defending infrastructure, or worse yet, could target the detection infrastructure itself by overloading it (which can be common with stateful firewalls, for example).

Stealth Mitigation for Simulating the Success of an Attack

The techniques herein specify an architecture and components allowing a network to mimic a successful DoS attack without any effect on the resources under attack, thus making the attacker think that the DoS attack was successful. To that end, several network components are specified in order to specify the required set of actions. In one embodiment, the traffic is redirected to a trap server that either mimics the behavior of the server under attack or actually becomes the victim of the attack. In another embodiment, a local proxy agent located at the edge of network performs a set of actions on behalf of the resource under attack, thus preventing the resource under attack from being affected while mimicking its behavior.

Specifically, according to one or more embodiments of the disclosure as described in detail below, attack traffic corresponding to a detected DoS attack from one or more attacker nodes is received at a denial of service (DoS) attack management node in a network. The DoS attack management node determines attack information relating to the attack traffic, including a type of the DoS attack and an intended target of the DoS attack. Then, the DoS attack management node triggers an attack mimicking action based on the attack information, where the attack mimicking action mimics a behavior of the intended target of the DoS attack that would be expected by the one or more attacker nodes if the DoS attack were successful.

Illustratively, the techniques described herein may be performed by hardware, software, and/or firmware, such as in accordance with the processes 244, 247 and 248, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Operationally, the disclosed embodiments specify an architecture that allows the network to protect itself from a set of DoS/DDoS attacks, while making the attacker think that the attack was successful. The disclosed embodiments rely on the availability of some form of traffic flagging at the edge of the network, e.g., where an edge device of the network performs DoS attacks detection, identification, and flagging.

Figure 4:
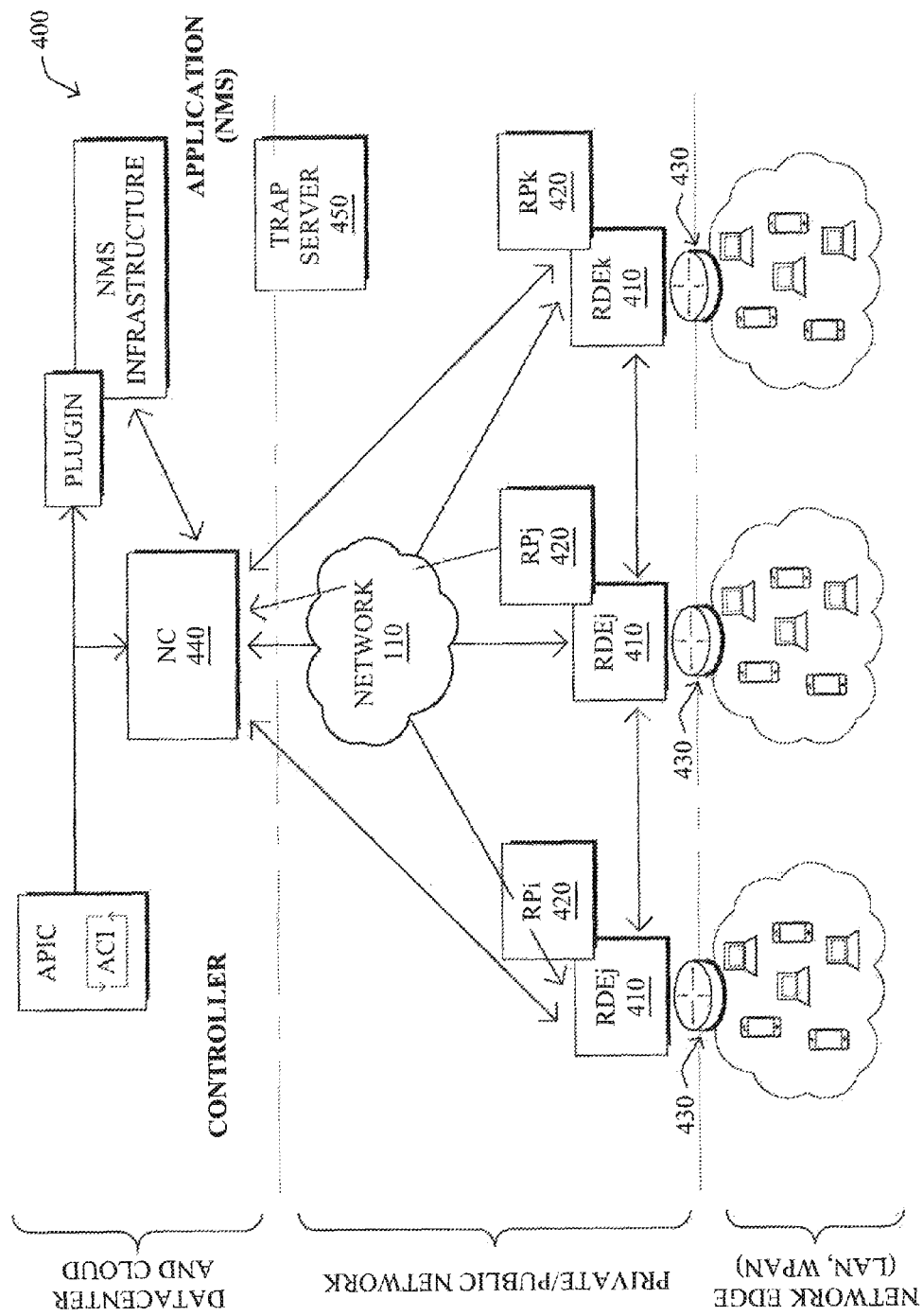
FIG. 4 illustrates an example diagrammatic representation of the architecture and components therein according to one or more embodiments of the present disclosure.

FIG. 4 illustrates an example diagrammatic representation of the architecture and components therein according to one or more embodiments of the present disclosure. As shown in FIG. 4, Remote Detecting Engine (RDE) 410, which includes $RDE_i$, $RDE_j$, and $RDE_k$, is hosted on an edge device 430 such as a router or a switch, that hosts one or more ML-based components used to detect a set of attacks S, identify these attacks (e.g., specifying which attack of the set S is indeed detected), and perform traffic flagging (e.g., segregation of attack traffic from normal traffic). Trap Server (TS) 450 may be used as a sink according to the process explained below. Remote Proxy (RP) 420, which includes $RP_i$, $RP_j$, and $RP_k$, co-hosted with $RDE_i$, $RDE_j$, and $RDE_k$, respectively, and used to act as the edge of the network for the attacker not to determine that its attack had been detected. The RDE 410 and RP 420 may be hosted on a device such as the device 200, as shown in FIG. 2, for example. Moreover, Network Controller (NC) 440 is a centralized entity node in the network. The above-referenced components may be interconnected via the network 110 (e.g., the Internet). In contrast with existing approaches to DoS mitigation, that simply black hole attacking traffic, the disclosed embodiments specify an architecture, as shown in FIG. 4, according to which, upon detecting an attack Si of the set S, a set of appropriate actions are triggered in the network in order to make the attacker think that his attack has succeeded.

A component of this disclosure consists in redirecting the attacking traffic along with a notification to the network controller 440 once the attack Si has been detected. Using suitable flagging mechanisms known in the art, the RDEi 410 may separate the attacking traffic from the normal traffic. In one embodiment, the attack traffic may be redirected to the NC 440. To this end, the attack traffic may be encapsulated in a tunnel terminating at the NC 440. Alternatively, a duplicated version (e.g., copy) of the attack traffic may be sent to the NC 440. Such traffic may further be rate limited or colored (if QoS is enabled in the network) with a low priority in order to not disrupt the normal traffic.

A message may sent by the RDEi 410 to the NC 440 in order to indicate the type of attack Si and allows the NC 440 to store the attacking traffic, where the attacking traffic could be used for post-processing analysis or to perform off-line training of machine learning-based algorithms such as an Artificial Neural Network (ANN), for example. If the NC 440 determines that that type of data is missing in the dataset used for training LMs, it may respond with a message specifying the endpoint the traffic has to be redirected to.

In another component of this disclosure, upon receiving the attacking traffic, the NC 440 may invoke a policy engine in order to determine the next action. Illustratively, with respect to FIG. 4, the policy engine is co-located with the NC 440; although the policy engine need not necessarily be co-located with the NC 440. If the policy engine is not co-located, a message (e.g., an encrypted IP message) may be sent to the policy engine that provides the following set of information: 1) type of detected attack (Si) and 2) information relating to the traffic flagging (e.g., intended target of the attack, source of the attack, intensity of the attack, identity of the reporting RDEi). For the purposes of the present disclosure, the NC 440 and the policy engine may be jointly referred to as a DoS attack management node.

A unicast IP v4/v6 message (e.g., stealth_action( ) message) may be sent by the policy engine (or the NC 440) to specify the action to be triggered (e.g., mimicking action), where the attack mimicking action mimics a behavior of the intended target of the DoS attack that would be expected by the one or more attacker nodes if the DoS attack were successful. Such a message may comprise a range of information, including the mimicking action to be taken, as described further below.

First, the traffic may be redirected to a trap server TSi 450 whose identity is provided by the policy engine. By redirecting traffic to a TS, the objective is not to "clean" up traffic and remove the attacking traffic, but rather to replicate the behavior of the intended target of the attack, whose identity has been provided by RDEi 410 to the NC 440 and the policy engine.

To this end, the policy engine may provide the service of the server under attack. That is, with a DoS attack, such as Slow Loris, the TSi 450 may act on behalf of the attacked server, mimicking the behavior of the server as if it was under attack by a Slow Loris DoS. The policy engine may instruct RDEi 410 to redirect the traffic to the TSi 450, and perform NAT (Network Address Translation) to spoof the address of the attacked server, thus making the architecture shown in FIG. 4 highly flexible. In one embodiment, the TSi 450 may purposely mimic the behavior expected from the attack (and potentially running out of resources). Such a behavior is particularly useful for unknown attacks since it may not be possible for the policy engine to indicate how TSi 450 should mimic the attack. Instead, TSi 450 may simply replicate the effect of the attack with no consequence on the actual server, which was originally the target of the attack. In yet another embodiment, if the policy server knows the effect of the identified attack Si, it may indicate to TSi 450 exactly how to mimic the effect of the attack. In either case, the TSi 450 allows for replicating the effect of the attack without any consequence on the actual server, resulting with the attacker not being capable of telling that the attack was detected.

Second, the policy engine may rather not redirect the traffic to the trap server 450, but instead download a so-called remote proxy (RP) 420 that is remote to the NC 440 and policy engine. Notably, the remote proxy may alternatively be referred to as a local proxy, as the device is local to the RDE 410. An objective of the RP 420, which is co-hosted with RDEi 410 at the edge device 430, is to perform local action in order for the network to react as if the attack had been effective without affecting the network. For instance, should a User Datagram Protocol (UDP)-type flooding take place, it would be detrimental to redirect a massive amount of traffic in the network. Instead, the RP 420 may be asked by the policy engine (or the NC 440) to perform a set of actions specified in the message referenced above (e.g., stealth_action( ) message). Such an action may include acting on behalf of the intended target of the DoS attack. For example, the RP 420 may be instructed to perform a first action that mitigates the attack traffic, such as rate limiting (or deprioritizing) the attack traffic, and also a second action that mimics the behavior of the intended target of the DoS attack that would be expected if the DoS attack were successful.

For example, if a server S is under attack with a large volume of UDP traffic, an attacker has, in principle, no way of knowing whether the attack reached its target or not, since UDP traffic is not intrinsically acknowledged (plus source addresses are likely to be spoofed). Therefore, it will probably establish a probing TCP connection with the target server (or any contiguous server in the network) in order to check whether the attack has been effective.

In this case, the RP 420 may rate limit the volume of attack traffic to a specific value for a given period of time, while replying to TCP flows directed to the targeted server.

Further, when replying to the attacker on behalf of the targeted server, the RP 420 may reply after injecting artificial delay for all packets coming from the source of the attack (which has been identified by the traffic flagging functionality of RDE 410), or potentially all sources of packet to the server. Thus way, the attacker may observe (artificial) delays for all traffic to the targeted server, thus thinking that the attack was effective.

In another, more sophisticated embodiment, the attacker may use a probing connection coming from a source that is completely unrelated to the source of the attack. For example, it could use a large botnet in order to launch a UDP flooding attack and another set of hosts for the purpose of establishing legitimate HTTP sessions with servers in the network under attack. In this case, even if the connection coming from the attack sources can be slowed down, those coming from the verifying hosts would perceive a good quality of service.

In one embodiment, the disclosed architecture handles this scenario by slowing down every connection except those which are in a "white list" of well-known legitimate sources. A reputation-based system can also be used in this regard. In another embodiment, the probing connections from the attacker can be identified using a LM algorithm which correlates the probes with the attack traffic.

A large set of local actions may be specified by the policy engine to achieve the same objective. An illustrative scenario is contemplated, where a TCP Syn Flood attack takes place in the network, and a targeted server SEi receives a large number of TCP segments with the SYN Flag set to trigger the server SEi to open a large amount of connections and keep their state up to resource exhaustion. In this particular example, the RP 420 may then mimic the three-way handshake with the identified attacker, and only for the suspected set of attacks. Of course, although particular counter-measures allowing for simulating a successful attack have been illustrated, the disclosed embodiments depict a highly scalable architecture allowing the network components to act in any manner suitable for mimicking a successful DoS attack, thus avoiding the highly undesirable effect of rotating attacks.

Yet another component of this disclosure relates to the early notification of other RDEs 410, Network Controllers 440, and Trap Servers 450 in the network thanks to a newly specified message in order to report the attack and proactively put in place all the mechanics specified in this invention across the network. That is, prior to the triggering of the attack mimicking action, one or more components in the network may be notified that the DoS attack has been detected, such that resources in the network that are needed to carry out the attack mimicking action may be readied ahead of time.

Figure 5:
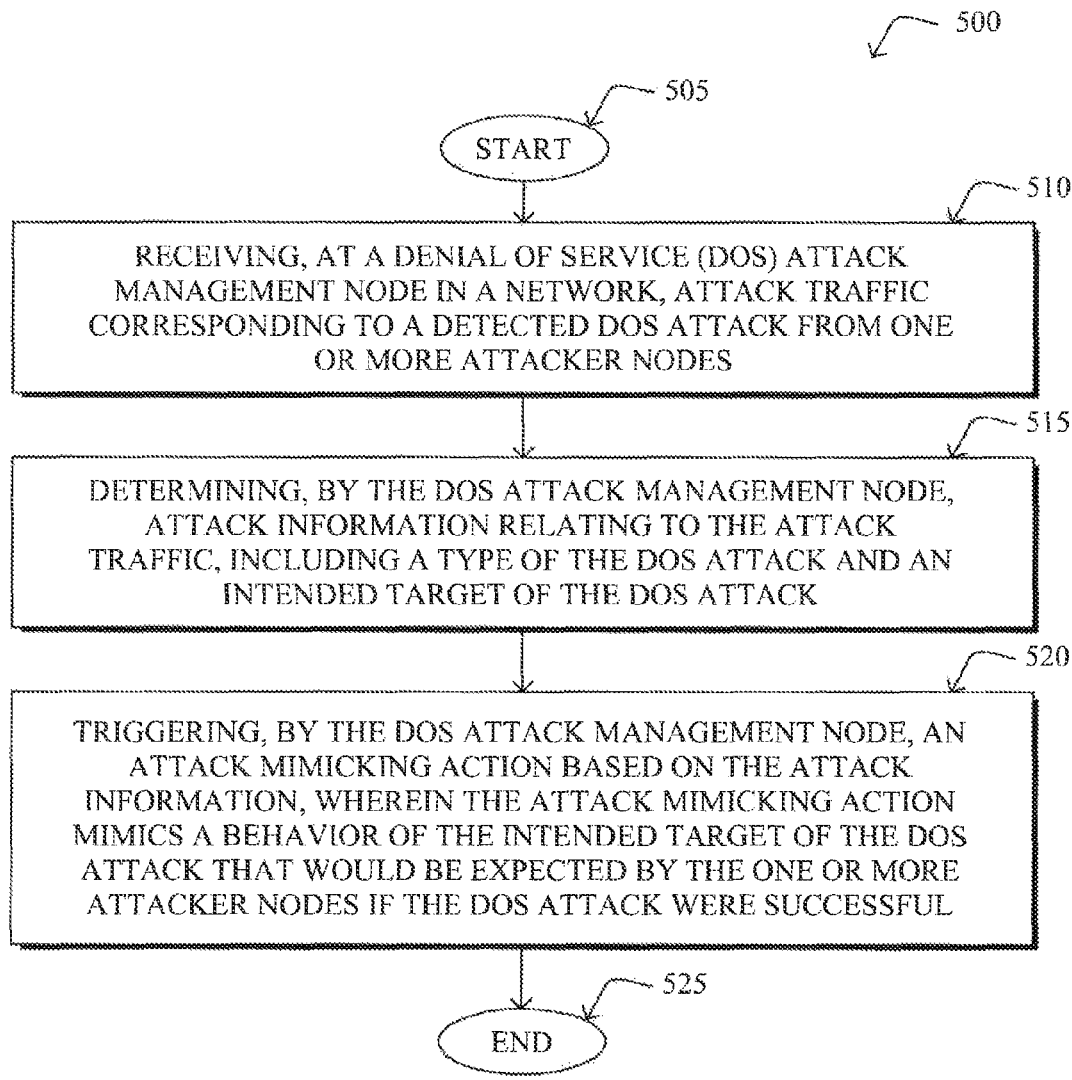
FIG. 5 illustrates an example simplified procedure for simulating the success of an attack.

FIG. 5 illustrates an example simplified procedure for simulating the success of a DoS attack in accordance with one or more embodiments described herein. The procedure 500 may start at step 505, and continues to step 510, and so on, where, as described in greater detail above, an attack mimicking action may be triggered by a device in a network (e.g., any of controllers/servers 102 or nodes/devices 104 shown in FIG. 1), where the attack mimicking action mimics a behavior of the intended target of a DoS attack that would be expected by the one or more attacker nodes if the DoS attack were successful.

At step 510, attack traffic corresponding to a detected DoS attack from one or more attacker nodes may be received at a denial of service (DoS) attack management node in a network. The DoS attack management node may include one or more of the NC 440 and the policy engine, as shown in the architecture of FIG. 4. The attack traffic may have been redirected from the RDE 410 hosted on an edge device in the network.

At step 515, the DoS attack management node may determine attack information relating to the attack traffic. The attack information may include, for example, a type of the DoS attack and an intended target of the DoS attack, in addition to an identity of the attacker, an identity of the RDE 410, an intensity of the DoS attack, and the like. The attack information may be provided to the DoS attack management node by the RDE 410.

Then, at step 520, the DoS attack management node may trigger an attack mimicking action based on the attack information mentioned above. And as further explained above, the attack mimicking action mimics a behavior of the intended target of the DoS attack that would be expected by the one or more attacker nodes if the DoS attack were successful. The attack mimicking action may encompass any action in the network which mimics the action of an attacked network resource, such that the attacker believes that the DoS attack was successful. For example, a trap server 450 may be utilized, where, in one instance, the attack traffic may be redirected to the trap server 450, such that the trap server responds to the incoming attack traffic in a manner which mimics the behavior of the intended target of the DoS attack. As another example, a remote proxy 420 may be utilized, where, the remote proxy is hosted on an edge device in the network and may perform one or more actions on behalf of the intended target of the DoS attack.

The procedure illustrative ends at step 535. The techniques by which the steps of procedure 500 may be performed, as well as ancillary procedures and parameters, are described in detail above.

It should be noted that the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, prevent rotating attacks (since once the attacker thinks that the attack has been successful, the attacker often selects a new target or a new attack vector) and also discourage the attacker from potentially retro-engineer the defense mechanism in place.

While there have been shown and described illustrative embodiments that provide for simulating the success of a DoS attack, it is to be understood that various other adaptations and modifications may be made within the spirit and scope of the embodiments herein. For example, while the techniques herein are described primarily with respect to mimicking DoS attacks, the techniques herein may also be adapted for use with various network attack methods other than DoS/DDoS attacks. In addition, while certain networks and topologies are described herein, the techniques may be applied more generally to any form of computer network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a denial of service (DoS) attack management node in a network, attack traffic corresponding to a detected DoS attack from one or more attacker nodes;
   determining, by the DoS attack management node, attack information relating to the attack traffic, including a specific type of the DoS attack as a classification label and an intended target of the DoS attack; and
   triggering, by the DoS attack management node, an attack mimicking action based on the attack information, wherein the attack mimicking action mimics a behavior of the intended target of the DoS attack that would be expected by the one or more attacker nodes if the DoS attack were successful.

2. The method as in claim 1, wherein the triggering of the attack mimicking action comprises:
   causing, by the DoS attack management node, the attack traffic to be redirected to a trap server in the network, such that the trap server responds to the incoming attack traffic in a manner which mimics the behavior of the intended target of the DoS attack that would be expected if the DoS attack were successful.

3. The method as in claim 1, wherein the triggering of the attack mimicking action comprises:
   when the DoS attack management node is aware of the behavior of the intended target of the DoS attack that would be expected if the DoS attack were successful, sending, by the DoS attack management node, an indication of the expected behavior to a trap server in the network; and
   instructing, by the DoS attack management node, the trap server to behave in accordance with the indicated expected behavior.

4. The method as in claim 1, wherein the triggering of the attack mimicking action comprises:
   instructing, by the DoS attack management node, a local proxy device in the network to perform one or more actions on behalf of the intended target of the DoS attack.

5. The method as in claim 4, wherein the one or more actions on behalf of the intended target of the DoS attack include:
   a first action that mitigates the attack traffic, and
   a second action that mimics the behavior of the intended target of the DoS attack that would be expected if the DoS attack were successful.

6. The method as in claim 5, wherein the first action includes rate limiting the attack traffic.

7. The method as in claim 5, wherein the second action comprises:
   identifying probes sent to the intended target of the DoS attack as corresponding to the attack traffic;
   responding to identified probes which were sent by a source of the DoS attack after injecting an artificial delay; and
   responding to identified probes which were sent by a source other than the source of the DoS attack without injecting the artificial delay.

8. The method as in claim 7, wherein the probes sent to the intended target of the DoS attack are identified as corresponding to the attack traffic using machine learning techniques.

9. The method as in claim 1, wherein the triggering of the attack mimicking action comprises:
   invoking, by the DoS attack management node, a policy engine to: i) determine the attack mimicking action to be triggered based on the attack information and ii) instruct one or more components in the network to perform the determined attack mimicking action.

10. The method as in claim 1, further comprising:
    prior to the triggering of the attack mimicking action, notifying, by the DoS attack management node, one or more components in the network that the DoS attack has been detected; and
    readying, by the DoS attack management node, resources in the network needed to carry out the attack mimicking action.

11. The method as in claim 1, wherein the detected DoS attack was detected and flagged by a machine learning attack detector hosted on an edge device in the network.

12. The method as in claim 1, wherein the attack information further includes one or more of: i) a source of the DoS attack, ii) an intensity of the DoS attack, or iii) an identity of a machine learning attack detector.

13. An apparatus, comprising:
    one or more network interfaces to communicate with a network as a denial of service (DoS) attack management node;
    a processor coupled to the one or more network interfaces and configured to execute a process; and
    a memory configured to store program instructions which include the process executable by the processor, the process comprising:
       receiving attack traffic corresponding to a detected DoS attack from one or more attacker nodes;
       determining attack information relating to the attack traffic, including a specific type of the DoS attack as a classification label and an intended target of the DoS attack; and
       triggering an attack mimicking action based on the attack information, wherein the attack mimicking action mimics a behavior of the intended target of the DoS attack that would be expected by the one or more attacker nodes if the DoS attack were successful.

14. The apparatus as in claim 13, wherein the triggering of the attack mimicking action comprises:
    causing a trap server in the network to respond to the incoming attack traffic in a manner which mimics the behavior of the intended target of the DoS attack that would be expected if the DoS attack were successful.

15. The apparatus as in claim 13, wherein the process further comprises:
    mitigating the attack traffic.

16. The apparatus as in claim 13, wherein the triggering of the attack mimicking action comprises:
    invoking a policy engine to: i) determine the attack mimicking action to be triggered based on the attack information and ii) instruct one or more components in the network to perform the determined attack mimicking action.

17. The apparatus as in claim 13, wherein the process further comprises:
   prior to the triggering of the attack mimicking action, notifying one or more components in the network that the DoS attack has been detected; and
   readying resources in the network needed to carry out the attack mimicking action.

18. A method, comprising:
   receiving, at a device in a computer network, from a denial of service (DoS) attack management node in a network, a trigger for an attack mimicking action based on a DoS attack from one or more attacker nodes as detected by the DoS attack management node;
   determining, by the device, attack information relating to the attack traffic from the trigger, the attack information including a specific type of the DoS attack as a classification label and an intended target of the DoS attack; and
   performing, by the device, the attack mimicking action based on the attack information, wherein the attack mimicking action mimics a behavior of the intended target of the DoS attack that would be expected by the one or more attacker nodes if the DoS attack were successful.

19. The method as in claim 18, wherein the device is a trap server in the network.

20. The method as in claim 18, wherein receiving the trigger comprises:
   receiving redirected attack traffic from the DoS attack management node.

21. The method as in claim 18, wherein receiving the trigger comprises:
   receiving an indication of the expected behavior and instructions to behave in accordance with the indicated expected behavior.

22. The method as in claim 1, wherein the attack mimicking action comprises one or more actions on behalf of the intended target, which include:
   a first action that mitigates the attack traffic, and
   a second action that mimics the behavior of the intended target of the DoS attack that would be expected if the DoS attack were successful.

23. The method as in claim 22, wherein the first action includes rate limiting the attack traffic.

24. The method as in claim 22, wherein the second action comprises:
   identifying probes sent to the intended target of the DoS attack as corresponding to the attack traffic;
   responding to identified probes which were sent by a source of the DoS attack after injecting an artificial delay; and
   responding to identified probes which were sent by a source other than the source of the DoS attack without injecting the artificial delay.

25. An apparatus, comprising:
   one or more network interfaces to communicate with a network;
   a processor coupled to the one or more network interfaces and configured to execute a process; and
   a memory configured to store program instructions which include the process executable by the processor, the process comprising:
      receiving, from a denial of service (DoS) attack management node in the network, a trigger for an attack mimicking action based on a DoS attack from one or more attacker nodes as detected by the DoS attack management node;
      determining attack information relating to the attack traffic from the trigger, the attack information including a specific type of the DoS attack as a classification label and an intended target of the DoS attack; and
      performing the attack mimicking action based on the attack information, wherein the attack mimicking action mimics a behavior of the intended target of the DoS attack that would be expected by the one or more attacker nodes if the DoS attack were successful.

* * * * *